United States Patent [19]

Yamashita et al.

[11] 4,377,483

[45] Mar. 22, 1983

[54] METHOD OF REMOVING DISSOLVED HEAVY METALS FROM AQUEOUS WASTE LIQUIDS

[75] Inventors: Kasane Yamashita, Kawasaki; Takao Ikehata, Yokosuka; Kazuhiko Tate; Keisuke Nakahara, both of Yokohama, all of Japan

[73] Assignee: Nippon Kokan Kabushiki Kaisha, Tokyo, Japan

[21] Appl. No.: 169,220

[22] Filed: Jul. 15, 1980

Related U.S. Application Data

[63] Continuation of Ser. No. 168,569, Jul. 14, 1980, abandoned.

[30] Foreign Application Priority Data

Jul. 13, 1979 [JP] Japan ............................ 54-88300
Oct. 4, 1979 [JP] Japan ............................ 54-127303
May 2, 1980 [JP] Japan ............................ 55-57788

[51] Int. Cl.³ .......................... C02F 1/28; C02F 11/14
[52] U.S. Cl. .................................. 210/670; 210/688; 210/711; 210/724; 210/751; 210/912; 210/913; 210/914
[58] Field of Search ........................ 210/665–667, 210/688, 702, 710, 711, 714, 716, 723–728, 751, 912–914, 670, 698

[56] References Cited

U.S. PATENT DOCUMENTS

| | | | |
|---|---|---|---|
| 1,139,618 | 5/1915 | Williams | 210/702 |
| 1,171,046 | 2/1916 | Heckman | 210/702 |
| 2,746,920 | 5/1956 | Wunderley | 210/667 |
| 3,890,225 | 6/1975 | Kajiyama | 210/688 |
| 4,012,320 | 3/1977 | Conner et al. | 210/711 |
| 4,051,316 | 9/1977 | Wing et al. | 210/731 |
| 4,159,944 | 7/1979 | Erickson | 210/606 |
| 4,257,898 | 3/1981 | Meurer et al. | 210/751 |
| 4,300,939 | 11/1981 | Hater et al. | 210/751 |

FOREIGN PATENT DOCUMENTS

| | | | |
|---|---|---|---|
| 49-59791 | 3/1974 | Japan | 210/716 |
| 50-36365 | 4/1975 | Japan | 210/914 |
| 50-56368 | 5/1975 | Japan | 210/912 |
| 51-28349 | 3/1976 | Japan | 210/688 |
| 52-53767 | 4/1977 | Japan | 210/914 |
| 54-62654 | 5/1979 | Japan | 210/912 |
| 55-01831 | 1/1980 | Japan | 210/912 |
| 1360648 | 7/1974 | United Kingdom . | |
| 1360844 | 7/1974 | United Kingdom . | |
| 1518024 | 7/1978 | United Kingdom . | |
| 385931 | 9/1973 | U.S.S.R. | 210/688 |
| 688439 | 9/1979 | U.S.S.R. | 210/714 |

*Primary Examiner*—Peter A. Hruskoci
*Attorney, Agent, or Firm*—Frishauf, Holtz, Goodman & Woodward

[57] ABSTRACT

A powder of a slag formed at the time of manufacturing steel is used to remove heavy metals contained in waste water. After the use the slag may be heated to recover the heavy metals adsorbed thereby or the used slag may be formed into solid blocks, ballast or aggregate by admixing with Portland cement or alumina cement.

19 Claims, 5 Drawing Figures

METHOD OF REMOVING DISSOLVED HEAVY METALS FROM AQUEOUS WASTE LIQUIDS

This application is a continuation application of Ser. No. 168,569 filed July 14, 1980 (now abandoned).

BACKGROUND OF THE INVENTION

This invention relates to a treating agent for treating dissolved heavy metals and a method treating dissolved heavy metals with the treating agent.

Such heavy metals as mercury, cadmium, chromium, lead or the like dissolved in water cause a public hazard and research has been made how to remove such dissolved heavy metals. However, according to prior art methods agents for removing the heavy metals and the process of utilizing the treating agents differ variously according to the kinds of the heavy metals to be removed. For example, mercury has been removed by chelate resin absorption method, ferrite method, a method of treating with activated carbon or by a method of coagulating and precipitating with a sulfide; cadmium has been removed by a method of coagulating and precipitating cadmium hydroxide, a chelate resin adsorption method; lead has been removed by a hydroxide coagulation and precipitation method, an ion exchange resin method or an electrolysis isolating method and chromium by a reduction precipitation method, an ion exchange method, a concentrating and recovering method or a foam separating method. Thus the treating agents and methods of treating vary depending upon the kinds of the heavy metals to be removed and the methods require a number of process steps. Especially where a plurality of kinds of heavy metals are contained in an aqueous solution it is necessary to use a number of overlapping process steps. In addition, the prior art methods described above require use of many types of treating agents, thereby increasing the cost of installation and operation. The result of removal of the heavy metals is not always satisfactory and it has been difficult to treat resulting precipitants or absorbed treating agent. These problems become more serious with increase in the concentration of the heavy metals dissolved in the aqueous solution, and the regulations for decreasing the public hazard are becoming more severe, so that to meet these severe regulations expensive installations and high cost operations are necessary, and there has been no efficient method of removing heavy metals contained in a mud or sludge.

SUMMARY OF THE INVENTION

Accordingly, it is an object of this invention to provide an efficient and low cost treating agent capable of removing heavy metals contained in an aqueous solution or mud.

Another object of this invention is to provide a novel method of efficiently removing heavy metals dissolved in an aqueous solution by utilizing an efficient and inexpensive treating agent.

A further object of this invention is to use a novel treating agent before treating waste water containing mercury with chelate resin thus increasing the useful life of the chelate resin and decreasing the quantity thereof to be used.

According to one aspect of this invention there is provided a treating agent for treating dissolved heavy metals, characterized in that the treating agent is a slag formed at the time of manufacturing steel.

According to another aspect of this invention, there is provided a method of treating dissolved heavy metals characterized in that a slag formed at the time of manufacturing steel is incorporated into substance containing dissolved heavy metals so as to absorb and fix the heavy metals by the slag.

According to still another aspect of this invention there is provided a method of treating heavy metals, characterized by the steps of stirring a precipitant containing the heavy metals to be efflued, thus causing the heavy metals to efflue into liquid and then incorporating a powder of a slag formed at the time of manufacturing steel into the liquid thereby causing the slag powder to adsorb and fix the dissolved heavy metals.

BRIEF DESCRIPTION OF THE DRAWINGS

These and further objects and advantages of the present invention can be more fully understood from the following detailed description taken in conjunction with the accompanying drawings in which.

DESCRIPTION OF THE PREFERRED EMBODIMENTS

Figure 1:
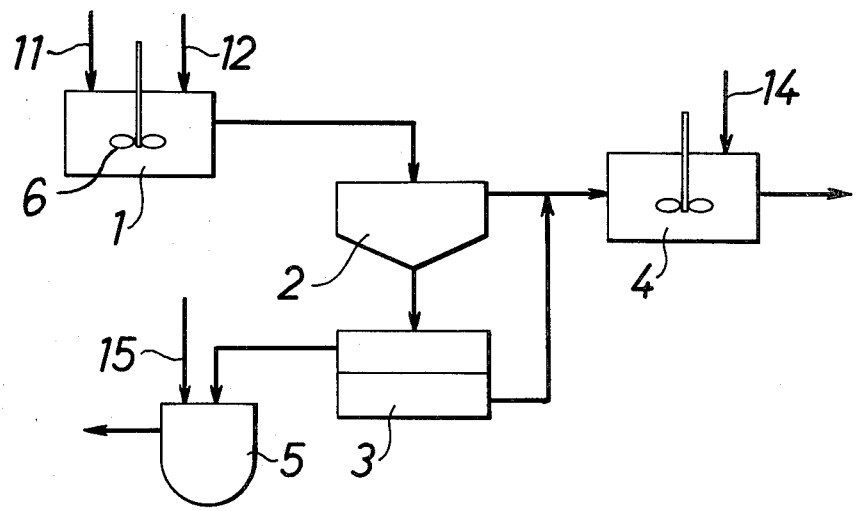
FIG. 1 is a diagrammatic representation of apparatus utilized to carry out the method of this invention.

A converter furnace slag which is a typical one produced at the time of manufacturing steel has generally the following composition although it varies substantially depending upon the conditions of manufacturing steel.

$SiO_2$: 9~20%
CaO: 37~59%
$Al_2O_3$: 0.1~2.5%
FeO: 5~20%
MgO: 0.6~8.0%
S: 0.06~0.25%
MnO: 1.3~10%
$TiO_2$: 0.4~0.9%
$P_2O_5$: 1.5~2.3%

At present, although the mechanism of adsorbing and fixing heavy metals of the converter furnace slag having the composition described above is not yet clearly understood, it is presumed such advantageous capability can be attributed to one or more of the following effects.

A. adsorptive effect caused by $2CaO \cdot SiO_2$ and phosphoric acid compounds,
B. coprecipitation effect caused by Fe,
C. precipitation effect caused by S,
D. hydroxide precipitation effect caused by a high pH value ($10.5 \pm 1.0$) and
E. ion substitution effect caused by CaO and MgO.
The slag utilized in this invention a remarkable capability of adsorbing heavy metals and stabilizing the adsorbed heavy metals not attained by prior art treating agents. The slag utilized in this invention is a converter furnace slag, a Siemens-Martin furnace slag or an electric furnace slag each manifesting similar advantageous effect although slightly different in composition.

Production of a slag is inherent to any type of the steel manufacturing furnace and the disposal slag has been costly. Thus, the slag utilized in this invention is very inexpensive and can be readily available. In addition, the treating agent, i.e. slag of this invention has an excellent adsorption capability and can be obtained readily. Thus, it is sufficient to contact the slag with an aqueous solution containing dissolved heavy metals. Moreover, the capability of the slag is not affected by SS (Suspended Solids) component or COD (Chemical Oxygen Demand) contained in the solution. Accordingly the slag may be admixed with such precipitates as sludge. Moreover, even when treating a solution or a precipitate containing different heavy metals, the heavy metals can be simultaneously removed by a single step as will be described later in detail so that no pretreatment is required. Moreover, the precipitating and dehydrating properties of the particles of the slag are thermally and chemically stable during the treatment and the heavy metals once adsorbed and fixed are stable so that they would not dissolve again under normal temperature whereby no subsequent treatment of the slag is necessary. Contact treatment can generally be carried out by mere agitation. Thus, it is only necessary to cause the solution to pass through a layer of the slag particles or to cause the solution to rotate on a layer of the slag particles or to cause the solution to come into contact with the slag particles by any suitable means. As will be described later in some cases, acid treated slag particles may be sprinkled on mud deposited on water bottom and containing heavy metals to form a layer of the slag particles, such layer being also effective to adsorb heavy metals. Especially, such heavy metals as Cd, Pb and Cr are not affected by pH value, so that the layer of the slag particles can absorb heavy metals from an underlying mud layer. The slag particles can be added periodically to a mud or sludge layer. The slag particles can be constantly added to waste water containing heavy metals so as to cause the slag particles to adsorb the heavy metals in a precipitation tank or while the waste water is being conveyed through a duct.

Another feature of this invention lies in the easiness of handling the treating agent after it has adsorbed heavy metals. As has been pointed out hereinabove, with the prior art treating agents, heavy metals once adsorbed thereby tend to dissolve again. In contrast, with the treating agent of this invention consisting of a furnace slag, the heavy metals once adsorbed by the treating agent do not dissolve again so that the used treating agent can be discarded without causing the problem of being a public hazard. If desired, the used slag can readily be solidified with an ordinary Portland cement or a blast furnace cement or plaster. With the prior art treating agent, however, it has been difficult or impossible to solidify the used treating agent with such hydraulic substances. Preferred methods of solidification are disclosed in Japanese Pat. Nos. 946,272 and 938,629, and the solidified blocks can be used for civil works and building constructions. The used treating agent not solidified in this manner can be used as a upper layer stabilizer.

Still another feature of this invention lies in that when treating waste water utilized to purify mercury with chelate resin, the treating agent of this invention is utilized to pretreat the mercury for decreasing the mercury concentration in the waste water to about 100~200 ppb thus elongating the useful life of the chelate resin. More particularly, although the method of removing mercury in the waste water with chelate resin to reduce the concentration of mercury remaining after the treatment to be less than a prescribed value is the best method, the quantity of the mercury adsorbed by the chelate resin is limited. In addition, the resin is not only expensive but also impossible to regenerate, so that it is necessary to recover mercury by burning used chelate resin which means a high cost for the mercury treatment. Use of the treating agent as a pretreating agent in the refining of mercury eliminates these disadvantages.

An experimental treating apparatus is diagrammatically illustrated in FIG. 1 which comprises a contact treating tank 1 into which a solution containing heavy metals is poured and particles of a slag formed at the time of preparing steel is admitted respectively through pipes 11 and 12. The contact treating tank 1 is equipped with an agitator 6. The liquid in the tank 1 is supplied to a separating tank 2 having a cone shaped bottom to separate solid and liquid. The liquid component is sent to a pH adjusting tank 4 with an acid incorporating pipe 14 to be adjusted its pH value, and thereafter discharged from the tank 4. On the other hand, the solid component is concentrated by a mud concentrator 3 and then sent to a kneading and molding machine 5 with a setting agent incorporating pipe 15. Thus, a hydraulic substance such as cement and plaster, is kneaded with the mud and then molded.

It should be understood that the commercial plant is substantially modified from the experimental apparatus shown in FIG. 1. For example, the treating tank 1 may be substituted by a column packed with a layer of slag particles through which a heavy metal containing liquid is caused to flow. In the column, coarse slag particles are packed at the bottom and the top to act respectively as a bed and a layer for suppressing floating up of the fine slag particles packed between the upper and bottom layers. The heavy metal containing liquid may be caused to flow downwardly under gravity or to flow upwardly. In a special case, the liquid may be introduced at an intermediate point of the column to flow downwardly and upwardly. Alternatively, a layer of the slag particles may be formed at the bottom of a trough or a duct over which the liquid may be passed slowly. Furthermore, the liquid may be introduced tangentially to create a stirring effect.

As will be described later in connection with the examples, the pH value of the liquid may be adjusted to about 7 by suitably selecting the composition of the liquid and the quantity of the slag before discharging the treated liquid. In this case, means 14 for adding an acid may be omitted.

Fine particles of the slag have a large surface area which increases the adsorption capability, but pulverization of the slag into extremely small particles increases not only the cost of pulverization but also the cost of separating the slag particles after the treatment of waste water, especially in a case of contacting by agitation. Generally stated, slag particles having a particle size of about 100 mesh can be readily prepared with a conventional pulverizer and have efficient adsorbing or reactive capability. As will be described later, the concentration of the heavy metals dissolved or contained in waste water discharged from commercial plants is relatively low so that the precipitation separation of the used slag particles is easy, and relatively coarse slag particles can be packed in the bottom of a column. Since the slag particles can be readily available at a low cost, the quantity of the slag particles is immaterial and combined use of coarse and fine (less than 100 mesh) particles is preferred.

The pH value of the liquid to be treated may vary widely. However, in a case where mercury should be sufficiently adsorbed, it is advantageous to decrease the pH value to be less than 2. In this case, however, where the slag particles are dipped in or sprinkled with an aqueous solution of a suitable acid so as to activate the slag particles, the pH value of the liquid to be treated may be substantially high. Where the pH value of the liquid to be treated exceeds 7, for example 10-11, the dissolved heavy metals would precipitate as hydroxides, thus enabling the removal of heavy metals. The amount of the slag particles to be incorporated and the contact time thereof (stirring interval) vary depending upon the kinds and concentration of the heavy metals. For example, in a case wherein water containing 10 ppm of mercury is treated with slag particles of 100 mesh to reduce the amount of mercury contained in the waste water to be less than a prescribed standard value of 0.005 ppm, where the value of pH of the original water is less than 2, it is sufficient to use slag powder in an amount of 10 Kg/m³ of the original water and a contact time of 30 minutes.

The clear liquor obtainable from the separating tank 2 and the mud concentrator 3 generally has a high pH value caused by the dissolving of calcium contained in the slag so that the water is discharged from the pH adjusting tank 4 after adjusting its pH value to a standard value of 5.8~8.6.

In the kneading and molding machine a solidifying agent is added in an amount of about 20~30% based on the volume of the solid component in the mud. After molding, the molded products are aged or cured for a desired aging time. During the kneading operation, an agent for increasing the volume, a quick setting agent or water may be added. In any case, efflution of heavy metals from the molded products is not noted, and the contents of the heavy metals of the molded products is less than the prescribed value for industrial discards.

As above described, the costs involved in practising the invention are those of pulverizing the slag and the acid for adjusting the pH value and pretreatment (removal of SS and decrease of COD), the chelate resin and other expensive treating agents and troublesome process steps are not necessary, thus decreasing the cost of treatment to a fraction of the prior method. Moreover, the adsorbed heavy metal, for example mercury, can readily be recovered by heating the used slag, and the slag thus regenerated can be used again.

Figure 3:
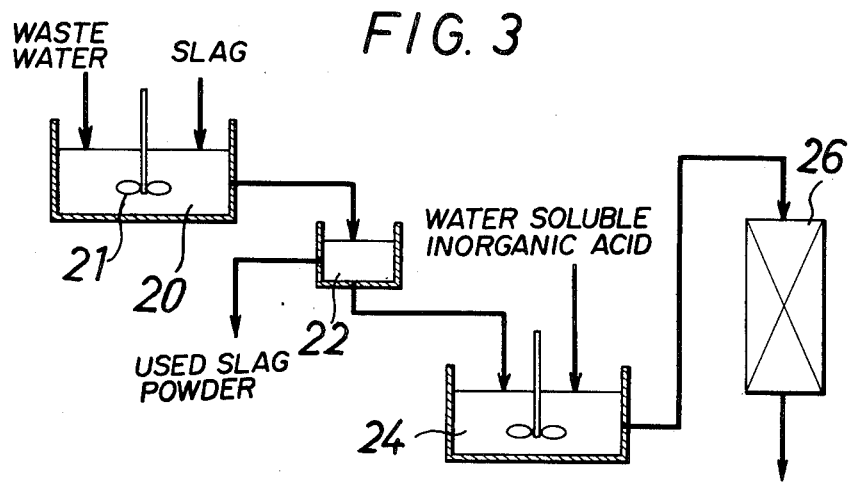
FIG. 3 is a diagram showing apparatus in which the method of this invention is carried out as a pretreating step for removing heavy metals by adsorption of chelate resin and FIG. 4 is a graph showing the relationship between the admixing and kneading time and the concentration of the remaining mercury.

The treating agent of this invention can also be used as a pretreating agent when removing mercury by absorbing it with chelate resin. FIG. 3 is a block diagram of such application. More particularly, waste water containing mercury and a fine powder of a converter furnace slag are admitted into a treating tank 20 equipped with an agitator 21. A slurry formed by stirring the mixture in the tank 20 for a suitable period is transferred to a separating tank 22 and separated into a liquid component and a solid component. The liquid component is sent to a pH adjusting tank 24 and the solid component, or used slag is solidified with cement.

A preferred method of solidification is disclosed in Japanese patent publication No. 27700/1978 entitled "Method of treating powdery or slurry industrial wastes containing heavy metals" by which the used slag can readily be solidified into a block from which no mercury dissolves. To the liquid component in the pH adjusting tank is added hydrochloric acid or a its water soluble calcium salt to adjust the pH value of the water component to 4~6. The resulting liquid component is then sent to a column 26 packed with chelate resin to remove mercury. The hydrochloric acid can be substituted by sulfuric acid in which case plaster will precipitate so that it is necessary to separate the plaster before the liquid component enters into the column 26.

It is advantageous to use a powder of a converter furnace slag having a particle size of 200 mesh or less. Then, the waste water may have a pH of less than 7. Where coarse slag particles larger than 200 mesh are used, it is necessary for the waste water to have a pH value of less than 4, preferably about 2. In practice, however, it is advantageous to use a powder of the slag having a particle size of less than 200 and to adjust the pH of the waste water to be less than 7. The quantity of the slag powder to be added and the mixing time are governed by the concentration of mercury contained in the waste water to be treated. For example, for a mercury concentration of 10 ppm and the particle size of 200 mesh, the quantity of the added slag powder is 16 Kg/m³ of the waste water, and the mixing time is 30 minutes.

For the purpose of more effectively treating dissolved heavy metals, especially mercury, in waste water, it is advantageous to treat the heavy metals with a converter furnace slag while keeping a predetermined pH value of the waste water and then treat them again with another slag.

More particularly, it has been found that it is sometimes very difficult to efficiently treat dissolved heavy metals, especially mercury, in waste water from HCl scrubber of an urban garbage furnace even using a converter furnace slag, as shown in the following Table 1.

TABLE 1

| Sample | Waste water | Concentration of dissolved heavy metals | | | |
|---|---|---|---|---|---|
| | | Hg mg/l | Cd mg/l | Pb mg/l | Cr mg/l |
| A | before treatment | 2.3 | 0.54 | 2.0 | 1.5 |
| | after treatment | N.D.* | 0.02 | 0.45 | 0.52 |
| B | before treatment | 8.3 | 0.36 | 5.4 | 0.68 |
| | after treatment | N.D. | 0.03 | 0.45 | 0.26 |
| C | before treatement | 4.5 | 2.6 | 12 | 7.2 |
| | after treatment | N.D. | 0.04 | 0.45 | 0.25 |
| D | before treatment | 7.9 | 1.3 | 6.2 | 5.4 |
| | after treatment | 0.004 | 0.04 | 0.50 | 0.42 |
| E | before treatment | 9.4 | 0.66 | 3.5 | 0.45 |
| | after treatement | 0.017 | 0.04 | 0.43 | 0.12 |

*N.D. (not determined) represents a concentration of less than 0.0005 mg/l

As can be seen from this Table, though dissolved Cd, Pb and Cr in each sample of waste water are satisfactorily removed it seems not possible in some cases to treat the concentration of mercury to be less than 0.0005 mg/l. The concentration of mercury in the sample E is treated to be 0.017 mg/l which is indeed reduced to less than 1/500 with respect to the original but is far from the prescribed standard value of 0.0005 mg/l. The concentration of mercury in the sample D is treated to be 0.004 mg/l which is reduced to less than 1/1000 but only just satisfies requirement of 0.0005 mg/l value.

Because of very small content of dissolved mercury, there is a great difficulty in accurately clarify the factors by which the efficient treatment of Hg concentration using the slag is interfered with. An exhaust gas discharged from a garbage burning furnace comprises not only HCl and $SO_2$ but also dust, composition of which considerably varies depending upon place and season, and COD also varies depending upon the construction or burning condition of the furnace, which are supposed to constitute one of the factors. For example, in the waste water from the HCl scrubber of the garbage furnace mercury is supposed to originally exist in the form of $HgCl_2$. Supposedly, mercury in the form of $HgCl_2$ dissolves metal component (M) contained in the dust, and the dissolved metal component and HCl partly react to form nascent hydrogen (H+) by the following equation (I), thereby making some reduction reactions as defined by the following equation (II) or (III).

$$M^{+x}+XHCl\rightarrow MCl_x+XH^+ \quad (I)$$

$$HgCl_2+H^+\rightarrow MgCl+HCl \quad (II)$$

$$HgCl_2+2H^+\rightarrow Hg+2HCl \quad (III)$$

That is to say, it is supposed that $Hg^{2+}$ is reduced to $Hg^+$ or Hg by H+ which causes a difficulty in efficiently treating dissolved mercury.

Moreover, there is a possibility that a part of dissolved mercury may be combined with alkyl, aryl or the like in the COD component contained in the dust so as to form an organomercury compound which decreases efficiency of the treatment.

Thus, it is thought that a part of mercury dissolved in some waste water may have a tendency to decrease the efficiency of the treatment using the converter furnace slag. Accordingly, in order to constantly and sufficiently remove mercury it is necessary to increase the effect of the slag to be used or to decompose the organomercury by the following chemical reactions.

(R, R': alkyl, aryl or the like)

The latter is called "Deoxy mercuration".

In this connection, it should be noted that the concentration of mercury remarkably reduced with treatment using the converter furnace slag when the pH value of the waste water is lower than 3, especially lower than 2. However, the pH value of the waste water tends to increase because CaO contained in the converter slag in an amount of 30~60% is partly dissolved in the solution by the following reaction.

$$CaO+H_2O\rightarrow Ca^{2+}+2OH^-$$

Figure 5:
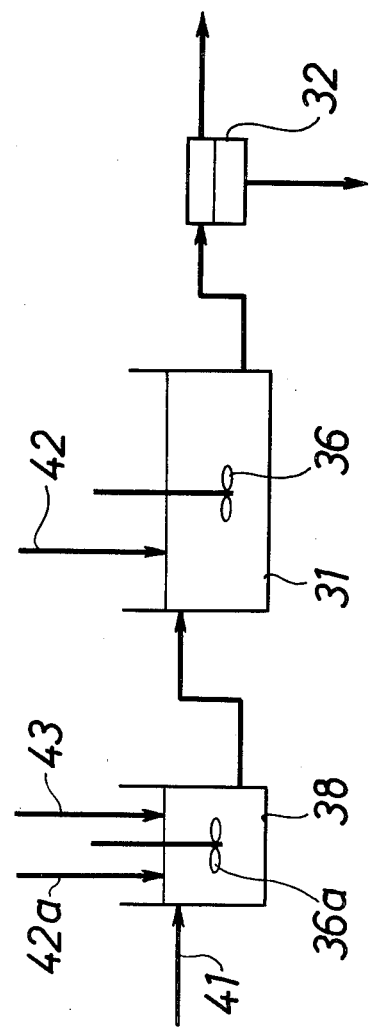
FIG. 5 is a diagram showing apparatus utilized to carry out the method of this invention for the purpose of substantially complete removal of dissolved heavy metals, especially mercury.

Thus, in order to constantly and effectively remove dissolved mercury in waste water from a HCl scrubber of a garbage furnace, it is supposed to be necessary to sufficiently lower the pH value of the solution to activate the slag. A treating apparatus used for the above mentioned purpose is shown in FIG. 5 which comprises a pH adjusting tank 38 arranged prior to a treating tank 31, with an agitator 36a and pipes 42a and 43 for introducing a converter furnace slag and acid respectively into the pH adjusting tank 38. An original waste water containing heavy metals (esp. mercury) is poured into the pH adjusting tank 38 and dissolved heavy metals are primarily treated with a slag poured through the pipe 42a. In the same tank 38 is poured acid to prevent the pH value of the solution to increase and to keep a predetermined pH value for predetermined time. The waste water with a definite pH value is sent to the treating tank 31 into which a converter furnace slag is introduced again to secondary treat the dissolved heavy metals. The pH value of the waste water in the pH adjusting tank 38 should be maintained to be 3 or less, preferably 1.5 or less, which is held as it is for at least 5 minutes, preferably 10 minutes or more. It is much more advantageous to adjust the pH value of the waste water to be 2.0 or less before pouring the waste water into the tank 38. Similarly to the apparatus shown in FIG. 1, the treated solution in the tank 31 is supplied to a separating tank 32 to separate into sludge and liquid. The separated sludge is conconcentrated and then molded with a setting agent and the liquid component is discharged after adjusting the pH value thereof. As described before, the discharged liquid component may be sent to a column packed with chelate resin to more efficiently remove mercury.

Though in the apparatus shown in FIG. 5 is the pH adjusting tank 38 provided to be independent of the treating tank 31, it should be understood that these tanks 31 and 38 may be contained in a common tank. For example, a tank having a rectangular cross-sectional figuration may be used, said tank having a dividing plate provided at the middle portion thereof to divide the tank into two sections corresponding to the pH adjusting tank 38 and the treating tank 31. The dividing plate is provided with an opening at the lower portion thereof for permitting the waste water to pass through from the pH adjusting section to the treating section. Alternatively, a tank having a circular cross-section may be used, said tank including a dividing plate having a length same as a diameter of the circular cross-section. With these construction it is possible not only to simplify an apparatus to be used but also to generally omit a means (e.g. pump, conduit, etc.) for conveying the waste water from the pH adjusting section to the treating section because of a fluidity of the waste water.

The treating agent of this invention is effective not only for already dissolved heavy metals but also substances containing heavy metals having a tendency to efflue into liquid. In the former case the heavy metals are dispersed at a low concentration in a large quantity of the liquid, whereas in the latter case the substance such as sludge contains the heavy metals at a relatively high concentration but the quantity of the sludge is much smaller than the liquid, i.e., water in contact therewith. As will be described later in connection with the examples, the treating agent of this invention is effective not only for low concentration of several ppm but also for high concentration higher than 100 ppm so that it can be applied for treating sludge or other precipitates. For example, the slag particles are supplied to and admixed with a precipitate at the bottom of water through a pipe. Alternatively, after dredging the precipitate, the slag powder is added thereto. In any case, it is possible to eliminate or greatly reduce the quantity of the heavy metals tending to dissolve.

To have better understanding of the invention the following examples are given.

EXAMPLE 1

Several samples of a solution having different pH values were prepared by adding predetermined quantities of 1 N.HCl to 100 ml of an aqueous solution of mercury whose mercury concentration has been adjusted to 10 ppm by adding a quantity of $HgCl_2$. To each sample was added 1.0 g of a powder of converter furnace slag having a particle size of 100 mesh and stirred for 30 minutes. After filtering the resulting mixture the mercury concentration and the pH value in the liquid component were measured and shown in the following Table 2. Mercury in the solution was analyzed by atomic absorption. This analysis was used in all examples.

TABLE 2

| pH of solution | mercury concentration (ppm) remaining in solution after treatment | pH of the solution after treatment |
|---|---|---|
| 3.0 | 2.4 | 11.8 |
| 2.1 | 0.75 | 11.3 |
| 1.8 | 0.0015 | 11.0 |
| 1.7 | less than 0.0001 | 10.7 |
| 1.6 | " | 10.0 |
| 1.5 | " | 9.6 |

Regarding the result shown in Table 2, a mercury concentration of 0.001 ppm is a limit of detection so that it is presumed that the concentrations of solutions having pH values of 1.6 and 1.5 will be substantially smaller than this value. A mercury concentration of 10 ppm is rather high among various factory waste waters (in one case about 2 to 3 ppm). Even a solution containing mercury at such high concentration can satisfy a standard of waste water (0.005 ppm) by reducing its pH value to 1.8. Considering the fact that the concentration of an ordinary waste water is reduced to about 0.0003~0.0005 ppm by using expensive chelate resin, the advantage of this invention especially obtainable at a pH value of about 1.6 is remarkable. Generally speaking, when mercury is removed by adsorption, the concentration of mercury in treated water decreases as the pH value of the waste water to be treated decreases.

EXAMPLE 2

An aqueous solution of mercury similar to that of Example 1 was prepared except that the concentration of mercury was made to be 100 ppm. An aqueous solution of 1 N.HCl was added to the solution to adjust the pH value variously. Although in an actual waste water such high concentration does not exist, this Example is given for the purpose of determining the maximum adsorption ability of the treating agent of this invention and for the purpose of confirming the fact that even a waste water containing mercury at a high concentration can be cleared without diluting the waste water. The powder of the converter furnace slag had the same particle size as that used in Example 1, i.e., 100 mesh, and 1.0 g of the powder was incorporated into 100 ml of the waste water, which was stirred for 30 minutes after incorporation of the slag powder and then filtered. The concentration of mercury remaining in the water and its pH value are shown in the following Table 3.

TABLE 3

| pH of solution | concentration of mercury remaining in treated water (ppm) | pH of treated water |
|---|---|---|
| 3.0 | 86 | 12.0 |
| 2.0 | 59 | 11.4 |
| 1.7 | 30 | 11.0 |
| 1.5 | 14 | 10.7 |
| 1.3 | 5.5 | 10.0 |
| 1.1 | 0.21 | 6.6 |

Irrespective of the high concentration described above, the concentration of mercury decreases with the pH value of the waste water. More particularly, the initial concentration 100 ppm of waste water of pH 1.1 was reduced to 0.21 ppm showing that about 10 mg of mercury was adsorbed by 1.0 g of the slag powder, which corresponds to about 1% of the weight of the slag. It is considered that this is the maximum adsorption. Where it is necessary to treat waste water of such high concentration the quantity of the slag to be incorporated is increased, or the treatment should be repeated.

EXAMPLE 3

An aqueous solution of mercury was prepared in the same manner as in Examples 1 and 2. Thus, an aqueous solution of 1 N.HCl was added to 100 ml of a solution containing mercury at a concentration of 9.6 ppm to adjust the pH of the solution to 1.5 for the purpose of determining the effective limit of the slag powder to be incorporated into the solution. More particularly, predetermined quantities of 100 mesh slag powder were added to the solution, stirred for 30 minutes and then filtered. The following Table 4 shows the concentration of mercury remaining in the filtered solution, the quantity of adsorbed mercury calculated from the mercury concentration and the pH value after the treatment.

TABLE 4

| quantity of converter furnace slag (mg) | concentration of mercury remaining in treated water (ppm) | quantity of adsorbed mercury (mg) | pH of treated water |
|---|---|---|---|
| 10 | 9.1 | 0.05 | 1.5 |
| 25 | 8.2 | 0.14 | 1.5 |
| 50 | 6.9 | 0.27 | 1.6 |
| 100 | 4.2 | 0.54 | 1.7 |
| 250 | 0.001 | 0.96 | 5.9 |
| 500 | less than 0.0001 | 0.96 | 9.0 |
| 1000 | " | 0.96 | 10.3 |

Figure 2:
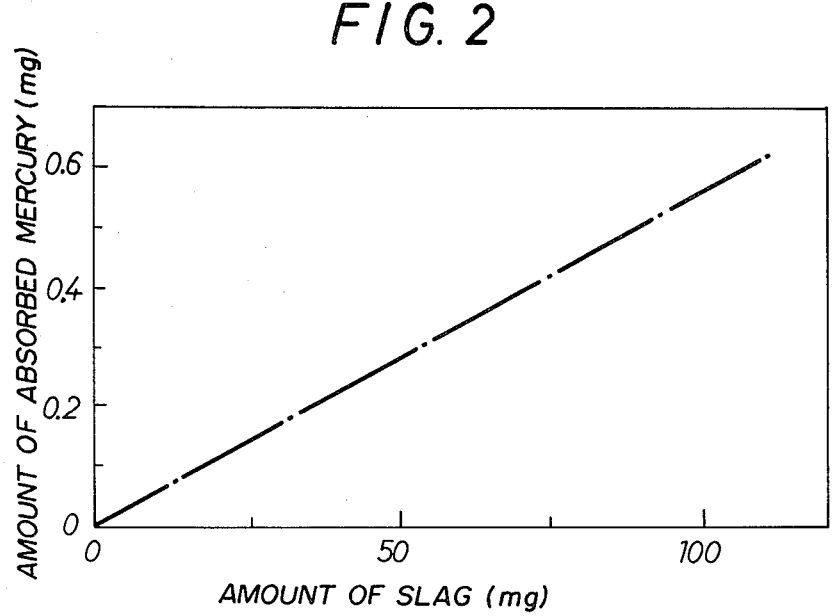
FIG. 2 is a graph showing the relationship between the quantity of a converter furnace slag and the quantity of mercury adsorbed thereby.

The relationship between the quantity of the converter furnace slag and the quantity of the adsorbed mercury is shown by a graph of FIG. 2.

As shown in Table 4, the quantity of the adsorbed mercury increases with the quantity of the slag and it is considered that with a quantity of slag larger than 250 mg, almost of all mercury in water will be adsorbed by the slag. As can be noted from FIG. 2, the quantity of adsorbed mercury is 5.4 mg per one gram of the slag. This shows that it is necessary to use about 2 Kg of the slag to treat 1 cubic meter of water containing mercury at a concentration of 10 ppm.

EXAMPLE 4

In this example, the value of the pH of the solution was maintained at a constant value (pH 7.0) and an acid was added to the slag. More particularly, 1.0 g of the slag was immersed in a predetermined quantity of an aqueous solution of 1 N.HCl for 3 minutes followed by the incorporation of $HgCl_2$ to adjust the concentration of mercury to 10 ppm and the pH value to 7.0. 100 ml of this solution was added to a waste water and the mixture was stirred for one hour and then filtered. The following Table 5 shows the concentration of mercury and pH value of the treated liquid.

TABLE 5

| quantity of 1N.HCl added (ml) | concentration of mercury remaining in treated water (ppm) | pH of treated water |
|---|---|---|
| 1 | 1.5 | 11.8 |
| 3 | 0.34 | 11.4 |
| 5 | 0.0045 | 9.5 |
| 10 | 0.22 | 5.3 |

Thus, when the slag is immersed in hydrochloric acid, the mercury concentration in the water decreases and up to 5 ml of the quantity of 1 N.HCl incorporated, the mercury concentration in the liquid decreases with the quantity of the hydrochloric acid. However, the quantity of incorporation exceeds 10 ml the concentration of mercury remaining in the treated liquid increases which is attributable to an excessive decomposition of the acid by the slag. When 1 g of the slag is treated with about 5 ml of 1 N.HCl, the mercury concentration in the liquid decreases greatly, showing that this method can also satisfy the standard of waste water.

EXAMPLE 5

In this example, the effect of the solution temperature at the time of adsorbing mercury by a converter furnace slag was investigated. More particularly, the temperature of a solution incorporated with $HgCl_2$ to make the concentration of mercury to be 9.4 ppm and adjusted its pH value to be 1.5 was varied variously as shown in Table 6, and 5 g of 100 mesh converter furnace slag was added to 500 ml of the solution. The solution was stirred for 30 minutes and then filtered. The concentration of the mercury and the pH values of the treated solution are shown in Table 6 which shows that the effect caused by temperature variation is very small and that at an elevated temperature of 60°~95° C. the concentration of mercury was below the detection limit (0.0001 ppm).

TABLE 6

| solution temp. °C. | concentration of mercury remaining in treated liquid (ppm) | pH of treated liquid |
|---|---|---|
| 5 | less than 0.0001 | 10.1 |
| 30 | " | 10.3 |
| 60 | " | 10.0 |
| 70 | " | 10.6 |
| 80 | " | 10.6 |
| 95 | " | 10.7 |

From the foregoing description it can be understood that the treating agent of this invention can satisfactory treat or purify high temperature waste solutions exhausted from various industrial steps utilizing steam or combustion and waste solutions discharged from plating factories without cooling the solutions. This constitutes an improvement over a conventional method utilizing chelate resin or an ion exchange resin at a high temperature above 60° C.

EXAMPLE 6

In this example sulfuric acid was used to adjust the pH value instead of hydrochloric acid.

Thus in HCl or 1 $N.H_2SO_4$ was incorporated into a mercury solution whose mercury concentration was adjusted to be 10 ppm by incorporating $HgCl_2$ to obtain solutions having predetermined pH values. 1.0 g of the 100 mesh converter furnace slag was added to the solutions, stirred for 30 minutes and then filtered. The mercury concentrations and pH values of the filtered liquid are shown in Table 7.

TABLE 7

| pH of solution | liquid for adjusting pH | mercury concentration remaining in treated liquid | pH of treated liquid |
|---|---|---|---|
| 2.0 | 1N HCl | 0.75 | 11.3 |
|  | 1N $H_2SO_4$ | 0.95 | 11.6 |
| 1.5 | 1N HCl | 0.0001 | 10.3 |
|  | 1N $H_2SO_4$ | 0.0002 | 10.5 |

This table shows that where sulfuric acid is used for adjusting pH the adsorbing property of the slag is the same as that using hydrochloric acid. Nitric acid is also effective but expensive. For this reason hydrohloric acid and sulfuric acid are preferred from the standpoint of cost.

EXAMPLE 7

In this example, use of heavy metals other than mercury was investigated. Thus chlorides of Cd, Pb, $Cr^{3+}$, Cu, Ni, Zn, $Mn^{2+}$ and As were used to adjust the concentrations of their aqueous solutions to 100 ppm respectively and their pH values were adjusted to 2.0 and 7.0. Then 1.0 g of 100 mesh converter furnace slag was added to each solution, stirred for 30 minutes and then filtered. The concentrations of the heavy metals and the pH values of the solutions are shown in the following Table 8.

TABLE 8

| type of heavy metals | initial concentration of heavy metals (ppm) | pH of solution | concentration of heavy metals remaining in solution after treatment (ppm) | pH of treated solution |
|---|---|---|---|---|
| Cd | 100 | 2.0 | 0.04 | 11.5 |
|  | " | 7.0 | 0.03 | 12.0 |
| Pb | " | 2.0 | 0.11 | 11.6 |
|  | " | 7.0 | 0.21 | 12.0 |
| $Cr^{3+}$ | " | 2.0 | 0.01 | 11.6 |
|  | " | 7.0 | 0.05 | 12.0 |
| Cu | " | 2.0 | 0.14 | 11.6 |
|  | " | 7.0 | 0.12 | 12.0 |
| Ni | " | 2.0 | 0.09 | 11.2 |
|  | " | 7.0 | 0.08 | 12.0 |
| Zn | " | 2.0 | 0.02 | 11.5 |
|  | " | 7.0 | 0.03 | 12.0 |
| $Mn^{2+}$ | " | 2.0 | 0.9 | 11.4 |
|  | " | 7.0 | 0.08 | 12.0 |
| As | " | 2.0 | 0.05 | 11.4 |
|  | " | 7.0 | 0.12 | 12.0 |

Thus, the concentrations of Cd, Pb, $Cr^{3+}$, etc. remaining in the solutions are reduced greatly and the concentrations of these heavy metals are not influenced by the variation in the pH values of the solutions. Furthermore, it was found that the treating agent of this invention is also effective for arsenic.

EXAMPLE 8

As above described since the treating agent of this invention is effective to mercury and various other heavy metals, in this example, waste water from HCl scrubber of a garbage furnace containing various heavy metals was treated with the treating agent of this invention. Thus, a 6 N.HCl aqueous solution was added to a 10% NaCl aqueous solution containing Hg, Cd, Pb and $Cr^{3+}$ at a concentration of 10 ppm each and pH of the solutions were adjusted to predetermined pH values. To 10 l of each solution was added a predetermined amount of the slag powder, stirred for 30 minutes and then filtered. The concentrations of Hg, Ce, Pb and $Cr^{3+}$ of respective solutions and pH values thereof are shown in the following Table 9.

TABLE 9

| quantity of slag (g) | pH of solution | heavy metal concentration in solution | | | | pH after treatment |
|---|---|---|---|---|---|---|
| | | Hg ppm | Cd ppm | Pb ppm | Cr ppm | |
| 100 | 1.5 | 0.001 | 0.10 | 0.75 | 0.50 | 9.4 |
| 300 | 1.0 | 0.0002 | 0.025 | 0.45 | 0.50 | 10.3 |
| 300 | 1.6 | 0.0002 | 0.025 | 0.45 | 0.50 | 11.0 |
| 500 | 0.8 | 0.0003 | 0.010 | 0.40 | 0.50 | 10.3 |
| 500 | 1.6 | 0.0002 | 0.025 | 0.40 | 0.50 | 11.2 |

Thus, even a waste water containing various heavy metals and salt these impurities are absorbed and fixed by the treating agent. Especially when the pH of the solution is adjusted to about 1.6~1.5 and more than 30 g of slag is incorporated per liter of the solution, the concentration of the solution was reduced to standard values of waste water (Hg: 0.005 mg/l, Cd: 0.1 mg/l, Pb: 1 mg/l, Cr: 2 mg/l). The fact that concentrations of the heavy metals shown in Table 8 mean that with a small quantity of slag a maximum adsorption can be assured.

EXAMPLE 9

200 ml of a powder of 16~24 mesh converter furnace slag was packed in a glass column having an inner diameter of 5 cm to a height of about 10 cm. The pH of the waste water formed by washing smoke of a dust burning furnace utilized in Example 8 and containing 10 ppm of each of Hg, Cd, Pb and Cr was adjusted to 1.6 with a 6 N.HCl aqueous solution. Then 5 l of water was passed through the column at a flow rate of 0.5 l/hour (SV=2.5/hr, LV=0.25 m/hr) and the measured concentrations of heavy metals are shown in the following Table 10.

TABLE 10

| concentration of heavy metals remaining after treatment | | | |
|---|---|---|---|
| Hg (ppm) | Cd (ppm) | Pb (ppm) | Cr (ppm) |
| 0.001 | 0.01 | 0.40 | 0.50 |

EXAMPLE 10

5 $m^3$ of the waste water formed by washing smoke from a dust burning furnace utilized in Example 8 and containing 10 ppm of each of Hg, Cd, Pb and Cr was filled in a 5 $m^3$ precipitation tank and then its pH was adjusted to 1.6 with 12 N.HCl. Thereafter 100 Kg of 100 mesh converter furnace slag was sprinkled on the surface of the waste water. After let stand still for 6 hours, the supernatant liquid was found to contain the heavy metals at concentrations as shown in the following Table 11.

TABLE 11

| concentration of heavy metal in supernatant liquid | | | |
|---|---|---|---|
| Hg (ppm) | Cd (ppm) | Pb (ppm) | Cr (ppm) |
| 0.0005 | 0.02 | 0.50 | 0.50 |

EXAMPLE 11

The slag was pretreated with a hydrochloric acid solution under the same conditions as in Example 8. Thus, a predetermined quantity of 100 mesh slag was immersed in a 1 N.HCl solution for 3 minutes, and then incorporated into 100 ml of a liquid having a composition similar to that of the waste water from HCl scrubber of a garbage furnace. Then the mixture was stirred for 30 and filtered. The concentration of mercury after the treatment, the quantity of slag added, and the quantity of 1 N.HCl per gram of the slag are shown in the following Table 12.

TABLE 12

| amount of 1N.HCl added per 1 g of slag (ml/g) | (unit: ppm) amount of convertion furnace slag | | | |
|---|---|---|---|---|
| | 1 g | 2 g | 3 g | 5 g |
| 1.5 | — | 0.04 | — | — |
| 2.5 | — | 0.001 | — | — |
| 3 | 0.46 | — | — | — |
| 5 | 0.023 | 0.0008 | 0.0005 | 0.0004 |
| 10 | 0.31 | 0.003 | 0.003 | — |

In this manner, even when the slag is immersed beforehand in an acid (or the acid may be sprinkled) and then used to treat a liquid containing Hg, Cd, Pb and $Cr^{3+}$, it is possible to greatly reduce the concentration of mercury. Where the amount of incorporation of 1 N.HCl per 1 g of the slag is constant, the concentration of the mercury remaining in the liquid can be decreased further by increasing the amount of the slag. On the other hand, when the amount of the slag is constant, it is advantageous to add 1 N.HCl in an amount of about 5 ml per 1 g of the slag. For example, the concentrations of heavy metals remaining in the treated liquid when 5 ml of 1 N.HCl was incorporated per 1 g of the slag are shown in the following Table 13.

TABLE 13

| amount of slag (g) | amount of 1N.HCl added (ml) | amount of 1N.HCl added per 1 g of slag (ml/g) | concentration of heavy metals remaining in the liquid after treatment | | | |
|---|---|---|---|---|---|---|
| | | | Hg (ppm) | Cd (ppm) | Pb (ppm) | $Cr^{3+}$ (ppm) |
| 1 | 5 | 5 | 0.00228 | 0.10 | 0.05 | 0.35 |
| 3 | 15 | 5 | 0.0004 | 0.05 | 0.50 | 0.40 |
| 5 | 25 | 5 | 0.0003 | 0.025 | 0.50 | 0.30 |

As can be noted from this Table 13, the concentrations of the remaining heavy metals decrease with the increase in the amount of the slag. In the case of treating 100 ml of the waste water described above, more than 3 g of the slag is sufficient to satisfy the standard of waste water. In other words 30 g of the slag is necessary to treat 1 l of the waste water which is substantially equal to the amount of slag necessary to treat the waste water after adjusting its pH value as shown in Example 8. To efficiently remove Cd, Pb and $Cr^{3+}$, better result can be obtained when the slag is pretreated with an acid.

EXAMPLE 12

In this example, adsorbed mercury was released for recovery.

More particularly, 2 g of the converter furnace slag and 200 ml of Hg aqueous solution (prepared by adding $HgCl_2$ and having a mercury concentration of 10 ppm, and a pH of 1.6) were admixed for 20 minutes in a beaker (200 rpm) and then filtered. The resulting slag that has adsorbed mercury was dried at a temperature of 50° C. for 3 hours and then heated at 200° C. and 500° C. respectively for 2 min. and 5 min. The amount of released mercury was measured and shown in the following Table 14, at which time, the mercury concentration in the liquid decreased to 0.0004 ppm.

TABLE 14

| releasing temp. (°C.) | releasing time (min) | amount of mercury released from 1 g of slag (mg) | percentage of recovery* (%) |
|---|---|---|---|
| 200 | 2 | 0.003 | 0.3 |
|  | 5 | 0.270 | 27.0 |
| 500 | 2 | 0.706 | 70.6 |
|  | 5 | 0.984 | 98.4 |

*estimated quantity of absorbed mercury per 1 g of the slag is 1.0 mg

As Table 14 clearly shows, the percentage of recovery of the mercury in the liquid is 98.4% when heated at 500° C. for 5 minutes, showing that substantially all of the mercury in the liquid was adsorbed by the slag. Even when dried or stirred at 50° C. for 3 hours there is no evaporation of mercury. For this reason, discard of slag which has adsorbed mercury does not release any mercury. When larger quantity of mercury is adsorbed by the slag as in the case of treating waste water containing mercury at a higher concentration it is possible to evaporate mercury by heating the used slag to about 500° C., and the evaporated mercury can be recovered by amalgamation.

EXAMPLE 13

In this example, a converter furnace slag which once has adsorbed and then regenerated was used. More particularly 1 N.HCl liquid was added to an aqueous solution of mercury (by incorporation of HgCl2, the concentration of mercury was adjusted to 10 ppm) to adjust the pH of the solution to a desired value. Then 1.0 g of the slag removed of mercury (heated at a temperature of 500° C. for 5 minutes) obtained in Example 10 was added and the mixture was stirred for 30 minutes followed by stirring. The mercury concentration of the resulting liquid is shown in Table 15.

TABLE 15

Mercury absorbing capability of a conversion furnace slag after removal of adsorbed mercury

| pH of solution | concentration mercury of remaining in the treated liquid |
|---|---|
| 1.7 | less than 0.0001 |
| 1.5 | " |

As Table 15 clearly shows, even a slag once adsorbed mercury can be used again when it is heated to evaporate off the mercury.

EXAMPLE 14

In this example, a converter furnace slag which has adsorbed heavy metals was solidified. More particularly, the following two muds obtained by adsorbing heavy metals by the slag (each in dry state).

mud Sample 1: containing 0.96% of mercury
mud Sample 2: containing 1.12% of Cd, 1.06% of Pb and 0.89% of Cr.

Efflution test was made on these two samples according to notification No. 13 of the Agency of Environment and the result is shown in the following Table 16 which shows that these samples may be discarded without any further treatment.

TABLE 16

| Sample No. | (unit: mg/l) | | | |
|---|---|---|---|---|
| | Hg | Cd | Pb | Cr |
| 1 | <0.0005 | — | — | — |
| 2 | — | <0.01 | <0.01 | <0.01 |

To these samples were added ordinary Portland cement, converter furnace slag, semi-aqueous plaster respectively, and the mixtures were kneaded. Then samples, each having a diameter of 50 mm and a length of 100 mm, were prepared and cured for 7 days in atmosphere. Table 17 below shows monoaxis compression strength of the cured samples.

TABLE 17

| | | composition (%) | | | monoaxis compression strength Kg/cm |
|---|---|---|---|---|---|
| mud 1 | mud 2 | Ordinary Portland cement | 100 mesh converter furnace slag | semi-aqueous plaster | |
| 1 | 80 | — | 20 | — | — | 118.2 |
| 2 | 80 | — | — | 18 | 2 | 66.7 |
| 3 | — | 80 | 20 | — | — | 109.5 |
| 4 | — | 80 | — | 18 | 2 | 62.1 |

When discarded on land the solidified matters are required to have a compression strength of higher than 10 Kg/cm² but the solidified matters described above have sufficient strength so that they can withstand handling and can be used in various civil works and building construction as gravel or aggregate.

The result of efflution test made on the solidified matters mentioned above are shown in the following Table 18 which shows that they satisfy the standard of treating wastes.

TABLE 18

| solidified matter | (mg/l) | | | |
|---|---|---|---|---|
| | Hg | Cd | Pb | Cr |
| 1 | <0.0005 | • | — | — |
| 2 | <0.0005 | — | — | — |
| 3 | — | <0.01 | <0.01 | <0.01 |
| 4 | — | <0.01 | <0.01 | <0.01 |

EXAMPLE 15

In this example, a sludge containing heavy metals was treated with an apparatus shown in FIG. 1. The concentrations of the heavy metals contained in the sludge and amount thereof effused from the sludge are shown in the following Table 19.

TABLE 19

| heavy metals | concentration (ppm) | amount of heavy metal effused from sludge |
|---|---|---|
| Hg | 3.25 | 0.025 |
| Cd | 52 | 0.50 |
| Pb | 530 | 0.35 |
| Cr | 98 | 0.68 |
| As | 7.2 | 0.11 |

To the respective three tanks each having a horizontal cross-sectional area of 700 cm² and a volume of 25 l were poured 2 Kg of the sludge and 20 l of water respectively. After completely precipitating the sludge component at the bottom of each tank, a converter furnace slag was not added in the tank A, 500 g of a powder of 100 mesh converter furnace slag was added in the tank B to form a film of 2 to 3 mm above a layer of precipitated sludge, and in the tank C was also added 500 g of a powder of 100 mesh converter furnace slag and then stirring the mixture at a low speed for 30 minutes. The concentrations of heavy metals remaining in the treated supernatant liquid in respective tank are shown in the following Table 20.

TABLE 20

| tank | Hg mg/l | Cd mg/l | Pb mg/l | Cr mg/l | As mg/l |
|---|---|---|---|---|---|
| A | 0.023 | 0.50 | 0.30 | 0.50 | 0.09 |
| B | 0.004 | 0.02 | 0.01 | 0.01 | 0.01 |
| C | 0.001 | 0.01 | 0.01 | 0.01 | 0.01 |

It can be seen from this Table that even when only a film of a converter furnace slag is formed amount of heavy metals effused from the sludge greatly reduced. When stirring the slag, it is of course possible to more efficiently treat heavy metals.

EXAMPLE 16

1/10 N.HCl solution was added to waste water from HCl scrubber of a dust burning furnace (having a pH of 8.2 and containing 8.4% of salt and 10.7 ppm of mercury) to adjust its pH to a predetermined value. To 100 ml of this solution was added 1.6 g of a powder of a conversion furnace slag having various grain sizes and then the mixture was stirred and kneaded for 6 hours. Then the solution was filtered with filter paper (Type 5C of Toyo Roshi Kabushiki Kaisha). The pH value and the mercury concentration of the filtrate are shown in the following Table 21.

TABLE 21

Capability of adsorbing and fixing mercury of a powder of a converter furnace slag

| grain size mesh | pH of solution | pH of treated liquid | amount of mercury remaining in treated liquid (ppm) |
|---|---|---|---|
| 16 ~ 24 | 2.0 | 8.4 | 0.20 |
|  | 4.0 | 11.6 | 4.9 |
|  | 6.0 | 11.7 | 5.2 |
|  | 8.0 | 11.7 | 5.5 |
| 24 ~ 32 | 2.0 | 9.8 | 0.20 |
|  | 4.0 | 11.8 | 4.7 |
|  | 6.0 | 11.8 | 4.7 |
|  | 8.0 | 11.9 | 5.3 |
| 32 ~ 200 | 2.0 | 11.5 | 0.19 |
|  | 4.0 | 11.8 | 4.0 |
|  | 6.0 | 11.8 | 4.3 |
|  | 8.0 | 11.9 | 4.3 |
| smaller than 200 mesh | 2.0 | 11.5 | 0.17 |
|  | 4.0 | 11.8 | 0.34 |

TABLE 21-continued

Capability of adsorbing and fixing mercury of a powder of a converter furnace slag

| grain size mesh | pH of solution | pH of treated liquid | amount of mercury remaining in treated liquid (ppm) |
|---|---|---|---|
|  | 6.0 | 11.8 | 0.35 |
|  | 8.0 | 12.0 | 0.70 |

As can be noted from the result shown in Table 21, the degree of decrease in the amount of the mercury remaining in the treated liquid is substantially influenced by the particle size of the slag powder. More particularly with a particle size smaller than 200 mesh, so long as the adjusted value of pH lies on the acid side, the concentration of remaining mercury decreases greatly. On the other hand, with slag powders having particles sizes of 16~24, 24~32 and 32~200 mesh, the pH value of the waste water has a substantial influence. Thus, with a pH of 2 the concentration of the remaining mercury can be reduced but with a pH value of higher than 4, the degree of decrease is small.

EXAMPLE 17

Figure 4:
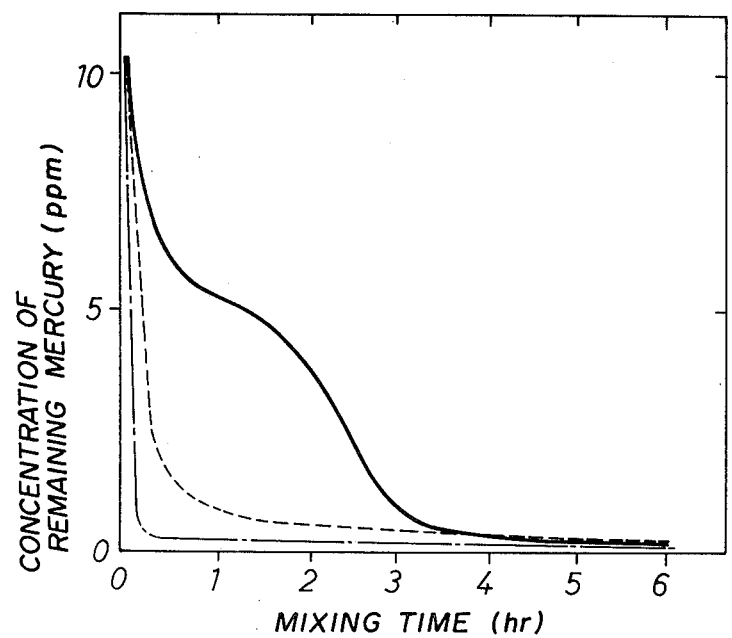

1/10 N.HCl solution was added to the same waste water from HCl scrubber as in Example 16 to adjust its pH value to 2.0. 1.6 g of a powder of a converter furnace slag having various grain size was added to 100 ml of this solution and then stirred. The variation with time of the mercury concentration of the solution is shown in FIG. 4 in which a solid line shows a case of using a slag powder having a grain size of 16~24 mesh, a dotted line shows a case of using a slag powder having a grain size of 32~200 mesh while a dot and dash line shows a case of using a slag powder having a grain size of smaller than 200 mesh. Thus, with a grain size of less than 200 mesh the mercury concentration decreases to 0.3 ppm after mixing for only 15 min. With a grain size of 32~200 the mercury concentration decreases to less than 1.0 ppm after mixing for 1 hour, whereas with a grain size of 16~24 mesh the mercury concentration decreases to less than 1.0 ppm after mixing for 3 hours.

CONTROL EXAMPLE

In the same manner as in Examples 15 and 16 ordinary Portland cement and alumina cement were added to waste water from HCl scrubber of a dust burning furnace and admixed for 6 hours. The pH value and amount of mercury remaining in the treated water are shown in the following Table 22.

TABLE 22 mercury adsorbing and fixing capability of cement

| type of cement | pH of solution | pH of treated solution | concentration of mercury remaining in treated solution (ppm) |
|---|---|---|---|
| Portland cement | 2.0 | 12.3 | 3.6 |
|  | 4.0 | 12.4 | 3.7 |
|  | 8.0 | 12.4 | 4.4 |
| alumina cement | 2.0 | 5.6 | 1.4 |
|  | 4.0 | 10.8 | 4.9 |
|  | 8.0 | 11.1 | 5.2 |

This table shows that a powder of a converter furnace slag can more efficiently remove mercury than these cements.

In addition, in the embodiments described above we have pretreated waste water containing mercury in various concentrations but to treat waste water containing mercury at a concentration of about 10 ppm it is advantageous to pretreat the waste water with the slag to suitably decrease the mercury concentration. Then it is possible to elongate the useful life of chelate resin than when it is used directly to treat waste water as in the prior art method. Accordingly, the amount of chelate resin can be reduced to 1/10 or less, usually to less than 1/20, with the result that the cost of removing mercury in the waste water can be decreased to less than 1/5 of the prior art method even though chelate resin is used in post treatment.

EXAMPLE 18

In this example, the waste water of the sample E shown in Table 1 (concentration of heavy metals: as represented in Table 1; concentration of NaCl: 12.4%) was treated with an apparatus shown in FIG. 5. More particularly, several samples of solution having different pH values were prepared by adding a quantity of 6 N.HCl to 5 l of the waste water E. To each sample was added a predetermined quantity of a powder of converter furnace slag having a particle size of 100 mesh and stirred for 10 minutes. The pH value of each solution was successively measured and a necessary quantity of 6 N.HCl was repeatedly poured so as to keep a predetermined pH value thereof all during stirring for 10 minutes. Thereafter, 100 g of a powder of converter furnace slag was added once more and stirred for 1 hour. After filtering the resulting mixture the mercury concentration, the pH value of the solution and the amount of added converter furnace slag were measured and shown in the following Table 23.

TABLE 23

| pH value to have been maintained | amount of slag added (g) first | second | Hg concentration in liquid component mg/l |
|---|---|---|---|
| 1.5 | 25 | 100 | 0.001 |
| 1.5 | 50 | 100 | N.D. |
| 1.5 | 100 | 100 | N.D. |
| 2.0 | 50 | 100 | 0.002 |
| 3.0 | 50 | 100 | 0.004 |
| original waste water from HCl scrubber | | | 9.4 |

Thus, when the pH value of the solution is maintained to be 3.0 the Hg concentration therein is reduced to be less than 0.005 mg/l and when the maintained pH value is reduced to be 1.5 the efficiency of the treatment is remarkably improved.

EXAMPLE 19

The waste water from HCl scrubber similar to that used in Example 18 was prepared and treated with the apparatus shown in FIG. 5 comprising a pH adjusting tank 38 with its volume of 10 l and a treating tank 31 with different volume. More particularly, the original waste water was poured into the pH adjusting tank 38 at a rate of 60 l/hour, only HCl was added to the waste water in the tank 38 to maintain its pH value to be 1.5 for 10 minutes, the solution is then sent to the treating tank 31 and a powder of the slag was added in this tank at a rate of 30 g per 1 l of original waste water. The concentrations of heavy metals in the treated solution in this case is shown in the Table 24 at an upper portion thereof. On the contrary, in the same Table 24 at a middle portion thereof is shown the result of treatment carried out in such manner that the waste water was supplied into the pH adjusting tank 38 at rate of 30 l/hour, 60 l/hour, 120 l/hour and 300 l/hour respectively (staying time thereof in the tank 38 with a volume of 10 l were, accordingly, 20, 10, 5 and 2 minutes respectively), while adding a powder of the slag at a rate of 10 g per original waste water 1 l the pH value of the solution was adjusted and maintained to be 1.5 by adding HCl, and in the treating tank 31 was incorporated a powder of the slag at a rate of 20 g per 1 l of the original, said tank 31 being prepared to have volume of 30 l, 60 l, 120 l and 300 l respectively.

TABLE 24

| amount of original waste water supplied l/hour | in the pH adjusting tank | | | in the treating tank | | concentration of heavy metals in treated solution | | | | | | | |
|---|---|---|---|---|---|---|---|---|---|---|---|---|---|
| | staying time min. | maintained pH value | amount of supplied slag g/hour | staying time min. | amount of supplied slag g/hour | Hg mg/l | Cd mg/l | Pb mg/l | Cr mg/l | Zn mg/l | Cu mg/l | Fe mg/l | Mn mg/l |
| 60 | 10 | 1.5 | 0 | 60 | 1200 | 0.015 | 0.02 | 0.4 | 0.2 | 0.5 | 0.05 | 1.0 | 0.1 |
| 30 | 20 | 1.5 | 300 | 60 | 600 | 0.001 | 0.05 | 0.4 | 0.3 | 0.5 | 0.1 | 1.7 | 0.1 |
| 60 | 10 | 1.5 | 600 | 60 | 1200 | 0.001 | 0.05 | 0.4 | 0.2 | 0.5 | 0.1 | 1.7 | 0.1 |
| 120 | 5 | 1.5 | 1200 | 60 | 2400 | 0.004 | 0.03 | 0.4 | 0.2 | 0.5 | 0.1 | 1.6 | 0.1 |
| 300 | 2 | 1.5 | 3000 | 60 | 6000 | 0.007 | 0.02 | 0.4 | 0.2 | 0.5 | 0.08 | 1.5 | 0.1 |
| original waste water from HCl scrubber | | | | | | 9.4 | 0.6 | 3.5 | 0.4 | 7.5 | 0.3 | 1.7 | 0.4 |
| prescribed standard value | | | | | | 0.005 | 0.1 | 1 | 2 | 5 | 3 | 10 | 10 |

Table 24 clearly shows that the Hg concentration of the waste water is much more efficiently treated with a converter furnace slag is added not only in the treating tank but also in the pH adjusting tank. Especially, when keeping a predetermined pH value of the solution in the pH adjusting tank for 5 minutes or more, preferably 10 minutes or more, the Hg concentration after treatment becomes sufficiently lower than the standard value of 0.005 mg/l.

What is claimed is:

1. A method for removing at least one dissolved metal selected from the group consisting of mercury and cadmium contained in an aqueous waste liquid which comprises the step of contacting particles of a steel-making converter slag with said waste liquid so as to absorb and fix said metal or metals on said slag particles, and separating said slag particles from said waste liquid, said steel making converter slag is converter furnace slag consisting essentially of 9–20 wt.% of $SiO_2$, 37–59 wt.% of CaO, 0.1–2.5 wt.% of $Al_2O_3$, 5–20 wt.% of FeO, 0.6–8.0 wt.% of MgO, 0.06–0.25 wt.% of S, 1.3–10.0 wt.% of MnO, 0.4–0.9 wt.% of $TiO_2$ and 1.5–2.3 wt.% of $P_2O_5$.

2. The method of claim 1 wherein said waste liquid comprises sludge containing said dissolved metal or metals.

3. The method of claim 1 which further comprises the step of adjusting the pH value of said waste liquid to be 7 or less before contacting said slag.

4. The method of claim 1 wherein said waste liquid contains mercury and which further comprises the step of adjusting the pH value of said waste liquid to be 2 or less before contacting said slag to remove said mercury from said waste liquid.

5. The method of claim 1 wherein said slag has a particle size of 100 mesh or is smaller.

6. The method of claim 1 wherein said slag is pretreated with acid.

7. The method of claim 1 wherein said waste liquid is passed through a layer of said slag particles.

8. The method of claim 1 wherein particles of said slag are sprinkled on a surface of said waste liquid and then caused to sink through said waste liquid.

9. The method of claim 1 which further comprises the steps of separating said slag which has absorbed said dissolved metal or metals from said waste liquid and then heating said separated slag to recover said metal or metals.

10. The method of claim 1 which further comprises the steps of separating said slag which has absorbed said metal or metals from said waste liquid and adding a solidifying agent to said separated slag to form a solid body.

11. The method of claim 1 which further comprises the step of adjusting the pH value of the separated waste liquid by adding acid thereto.

12. The method of claim 1 wherein said waste liquid comprises solution containing dissolved mercury and which further comprises the step of contacting a chelate resin with said solution after said contact with said slag.

13. The method of claim 12 wherein the pH of said solution is adjusted to 7 or less before contacting said slag powder which has a particle size of 200 mesh or smaller.

14. The method of claim 12 wherein the pH value of said solution is adjusted to 4 or less before contacting said slag powder which has a particle size of larger than 200 mesh.

15. The method of claim 1 wherein said waste liquid comprises a solution containing dissolved mercury and which further comprises the steps of adding acid and said slag to said solution so as to adjust and maintain the pH value of said solution to 3 or less for 5 minutes or more and then further adding an additional amount of said slag into said solution.

16. The method of claim 15 which further comprises the step of adjusting the pH value of said solution to 2 or less before contacting the acid and said slag together.

17. The method of claim 15 which further comprises the step of treating said solution with a chelate resin after adding an additional amount of said slag.

18. The method of claim 1 wherein said waste liquid contains cadmium.

19. The method of any one of claims 1, 3, 4, 15 and 18 wherein said waste liquid contains mercury and cadmium.

* * * * *